United States Patent [19]

Hellon

[11] Patent Number: 4,589,551

[45] Date of Patent: May 20, 1986

[54] CONTAINER FOR HANDLING, TRANSPORTATION AND STORAGE OF MICROSCOPE SLIDES

[75] Inventor: Keith Hellon, Libertyville, Ill.

[73] Assignee: MacLean-Fogg Company, Mundelein, Ill.

[21] Appl. No.: 636,319

[22] Filed: Jul. 31, 1984

[51] Int. Cl.⁴ .......................... B65D 85/48; B65D 1/36
[52] U.S. Cl. .................................... 206/456; 206/454; 206/45.2; 206/508; 206/509; 220/341
[58] Field of Search ............... 206/456, 454, 455, 508, 206/509, 558, 45.23, 45.2; 220/341; 281/33; 16/255, DIG. 13

[56] References Cited

U.S. PATENT DOCUMENTS

| | | | |
|---|---|---|---|
| 647,517 | 4/1900 | Pike | 281/33 |
| 1,697,277 | 1/1929 | Hoopes | 16/225 |
| 2,690,799 | 10/1954 | Gerstenmaier | 16/225 |
| 3,191,791 | 6/1965 | Jackson | 206/509 |
| 3,640,379 | 2/1972 | Weingarden | 206/558 |
| 3,756,393 | 9/1973 | Markwitz et al. | 206/456 |
| 3,845,875 | 11/1974 | Douglas et al. | 206/509 |
| 4,077,515 | 3/1978 | Shoberg | 206/456 |
| 4,091,917 | 5/1978 | Clawson et al. | 206/5.1 |
| 4,207,980 | 6/1980 | Namiki | 206/456 |
| 4,483,442 | 11/1984 | Worth | 206/560 |

FOREIGN PATENT DOCUMENTS 404529 6/1966 Switzerland .................. 206/508

*Primary Examiner*—William Price
*Assistant Examiner*—Brenda J. Ehrhardt

*Attorney, Agent, or Firm*—Mason, Kolehmainen, Rathburn & Wyss

[57] ABSTRACT

A container for handling, transportation and storage of microscope slides includes a plurality of individual microscope slide-receiving compartments. Each compartment includes a plurality of rounded protuberances extending upwardly in each individual compartment for contacting a lower surface of the microscope slide to space the microscope slide upwardly from an inner surface of the compartments and a plurality of rounded protuberances extending downwardly from one or more cover members to restrain vertical slide movement while maintaining longitudinal and lateral spacing of the microscope slides. The container includes one or more plastic cover members having a generally planar surface overlying the plurality of microscope slides when the cover is in a closed position including a plurality of downwardly extending rounded protuberances within each of the slide-receiving compartments for vertical restraint of each microscope slide with minimum contact against the specimen-receiving face of each slide. The container covers are secured to the container by elongated, flexible hinge material to enable the cover member to be rotated or articulated from the closed position to an open, stackable position disposed adjacent an outer, lower surface of the container. Each cover member includes a plurality of alignment posts received within indentations within a ledge surface of partition walls forming the container compartments to maintain the cover members in a fixed position.

12 Claims, 10 Drawing Figures

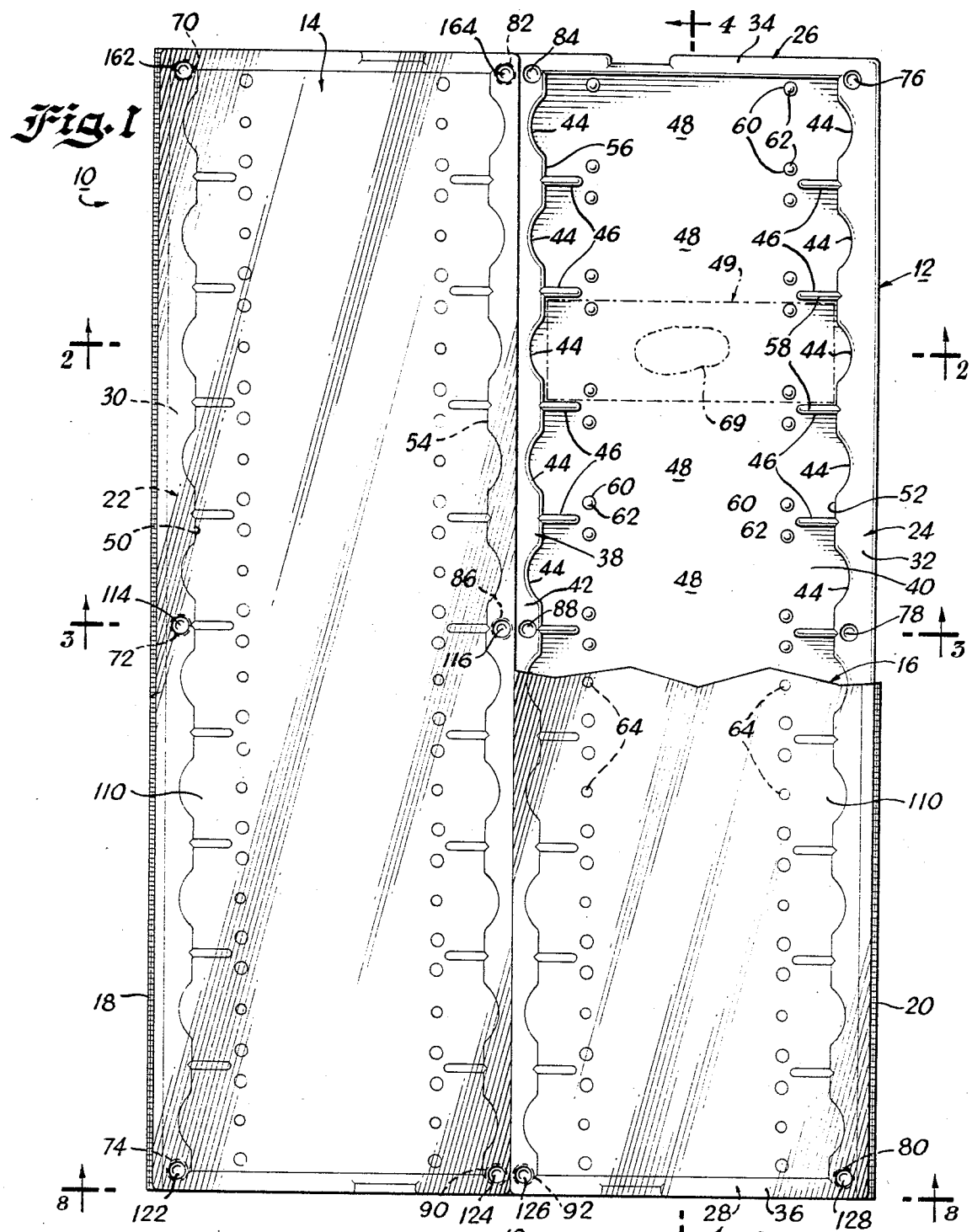
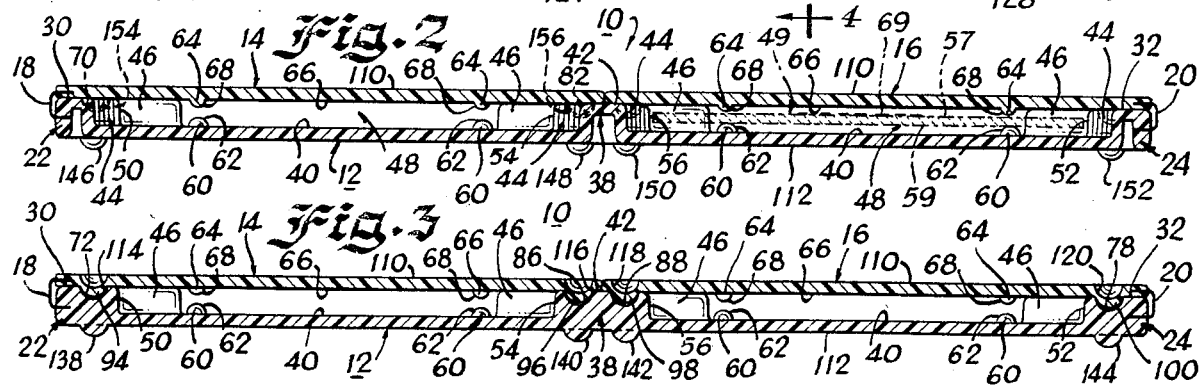

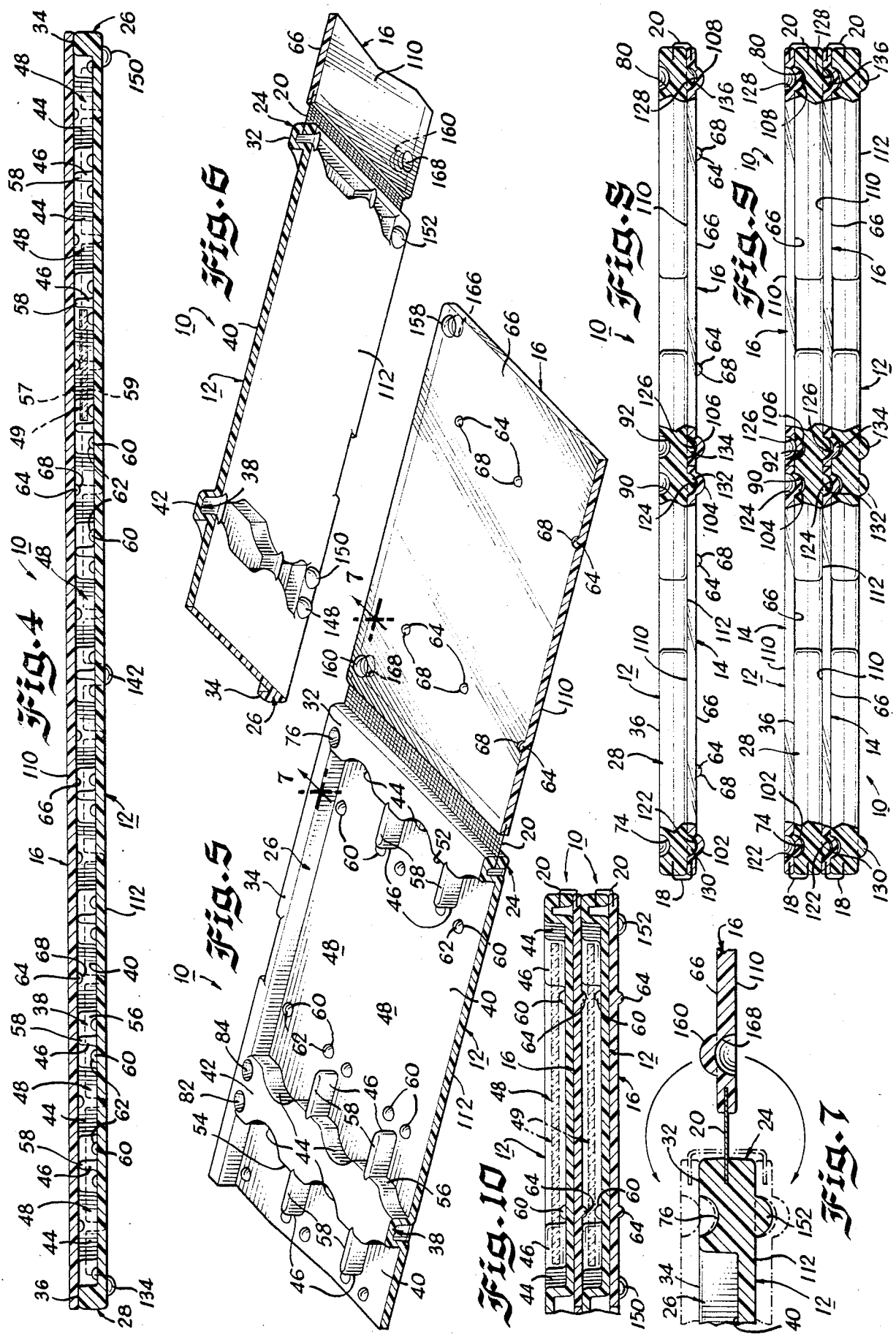

CONTAINER FOR HANDLING, TRANSPORTATION AND STORAGE OF MICROSCOPE SLIDES

FIELD OF THE INVENTION

The present invention is directed to a container for handling, transportation and storage of microscope slides. More particularly, the present invention is directed to a microscope slide holder for removably retaining a plurality of microscope slides in a predetermined spaced relationship, one to another, wherein the microscope slides are restrained in a fixed position within a plurality of slide-receiving compartments. The container includes one or more hinged cover members rotatable approximately 360° from a closed position overlying the microscope slides to an open, stackable position where the cover members are rotated adjacent a bottom outer surface of the container.

BACKGROUND OF THE INVENTION AND PRIOR ART

Microscope slide containers or folders manufactured of various materials such as cardboard and plastic have been made for many years for the purpose of storing and indexing microscope analyzeable specimen materials supported on a glass microscope slide. Various microscope slide containers have been proposed in an attempt to provide the microscope slide holder with advantages such as a hinged cover rotatable to be positioned adjacent on outer bottom surface of the slide holder; a lifting member secured to the inner bottom surface of the container for raising the microscope slide above the floor of separate microscope slide receiving compartments; finger recesses within each microscope slide receiving compartment for ease in positioning or removing a microscope slide from each compartment; and structural elements within the microscope slide receiving compartments to maintain each microscope slide in a fixed position for handling and transport with minimal disturbance of the analyzeable specimen material.

One slide holder presently marketed by Scientific Products, division of American Hospital Supply Corporation, McGaw Park, Ill. 60085, M6305, Pop-Up Slide Holder is manufactured of "heavy pressed cardboard" and includes 20 separate microscope slidereceiving compartments covered by two separate, mating, elongated covers secured to the slide holder with elongated tapes to permit approximately 360° articulation of the covers so that the covers can be positioned adjacent the outer bottom surface of the slide holder.

The Harrison U.S. Pat. No. 3,156,371 discloses a foamed plastic container which can be shipped in the form of a blank and can be easily and quickly assembled. The container includes end walls and side walls, each hinged to a bottom by a plastic or paper mesh. When the container is folded into position, the walls interlock with the bottom and are firmly held together by the tension created by the mesh hinge. The container is used for shipping articles such as electron tubes and electronic components having a shape identical to the shape of the component in the container. The Harrison U.S. Pat. No. 3,156,371 does not relate to a slide holder.

The Pickett U.S. Pat. No. 3,456,300 discloses an arrangement of knobs on the surface of plates for providing a space between adjacent stacked plates. However, the Pickett patent does not disclose mating recesses in the bottom of each plate, as provided in the microscope slide holder of the present invention. The purpose of the knobs in the Pickett patent is to provide an open space between adjacent plates when the plates are stacked upon one another in order to permit fixation fluid to enter between the plates when stacked.

The Jones U.S. Pat. No. 3,746,161 discloses a tray-like holder for accommodating microscope slides, molded from organo-plastic materials. The holding tray includes a base, end walls and sidewalls, all of which form a rectangle. A plurality of spaced first partitions extend upwardly from the base to form a plurality of transverse receptacles for microscope slides between adjacent partitions. The holder also has a plurality of cutaway walls or openings formed in the base and located between each of the adjacent partitions. The slides are placed between partitions with the short edges of the slide placed against abutment means near the sidewalls, with the side edge portions of the slide in engagement with the adjacent partitions. In order to remove a slide, a finger is placed into the uncovered portion of the opening and against the shorter edge of the slide to lift it out.

The Jones U.S. Pat. No. 3,746,161 does not provide means for preventing vertical movement, but rather, only for preventing horizontal movement by partitions and abutment means with one entire side of each slide resting on the base. The microscope slide holder of the present invention has rounded protuberances extending upwardly from the base of each slide compartment and downwardly from the cover located over each slide compartment to hold the slides in order to prevent vertical movement.

The Markwitz et al U.S. Pat. No. 3,756,393 discloses a microscope slide container made from plastic and having a first body member which includes peripheral end flanges defining a space, divided by a central edge flange section to provide equal reception recesses or slide compartments. Stop projections extend inwardly from the shorter edges of the reception recesses. Adjacent the longer section of the edge flanges are elongate rib-like stop projections formed integral with the support projections. This arrangement permits microscope slides to be placed into the recesses so that the slide face is supported by the edge of the rib-like support projections, while the short edges of the slide abut the stop projection.

A second body member is included in the Markowitz et al. design which has the sole function of covering the first body member to form a complete container by sliding over the edge flange of the first body member. The cover body member is provided with two rib-like projections in the form of lands, which are situated above the supporting projections when the container is closed. The rib-like lands of the lid body member extend about 1 mm from the inward face of the body member and contact the other slide face of the object slide not in contact with the support projections, so that the object slides may not leave the recesses.

Although the Markwitz et al. support projections of the first body member and the holding projections of the cover body member provide means for preventing vertical slide movement, the support projections come into contact with an area that is equal to the entire width of a slide and, therefore, have a greater probability of coming into contact with sensitive specimen areas of a slide. On the other hand, the microscope slide holder of the present invention provides rounded protuberances, extending downward from the cover, that come into contact with portions of a slide surface in only two very small areas, thus lessening the chances of damaging a sensitive portion of a slide specimen.

The Sholberg U.S. Pat. No. 4,077,515 discloses a molded plastic microscope slide enclosure case having mirror image left and right sections joined at their adjacent edges by a thin plastic hinge which allows one section to fold over and overlie another section. Hook clasps maintain the sections in a closed relationship in order to hold and protect the slides therein. One section includes a slide receiving cavity defined by longitudinal walls, a lower segment of an annular wall, and a tapered end of a transverse end wall. Elongate ribs or longitudinal spacer ledges and transverse spacer ledges upstand from the bottom wall of the slide compartment and serve to support a slide therein.

Unlike the microscope slide holder of the present invention having a plurality of rounded protuberances extending downward from the cover relative each slide compartment in order to prevent vertical slide movement, the means in the Shoberg patent for holding a slide in the compartment in order to prevent vertical movement, are the longitudinal and transverse spacer ledges. With the Shoberg arrangement of supports, a large area of the slide surface is in direct contact with these ledges and thus more susceptible to damage.

The Namiki U.S. Pat. No. 4,236,635 discloses a filing sheet for storing a plurality of microscope slides within recesses, each including four upward projections for supporting a slide above the base portion of the sheet so that the slide is thereby supported on the four upward projections. Depending shoulders at each end of a recess extend part way across each recess and allow a slide to be inserted beneath the shoulders after which vertical movement of a slide is restrained by the shoulders and the projections. The Namiki U.S. Pat. No. 4,236,635 discloses transparent or translucent plastic for ready slide inspection. While the Namiki patent shows upstanding projections, it discloses shoulders above the slides which contact a substantial surface area of the microscope slides.

SUMMARY OF THE INVENTION

In brief, the present invention is directed to a container for handling, transportation and storage of microscope slides having a plurality of individual microscope slide-receiving compartments. Each compartment includes a plurality of rounded protuberances extending upwardly in each individual compartment for contacting a lower surface of the microscope slide to space the microscope slide upwardly from an inner surface of the compartments and a plurality of rounded protuberances extending downwardly from one or more cover members to restrain vertical slide movement while maintaining longitudinal and lateral spacing of the microscope slides. The container of the present invention includes one or more plastic cover members having a generally planar surface overlying the plurality of microscope slides when the cover is in a closed position including a plurality of downwardly extending rounded protuberances within each of the slide-receiving compartments for vertical restraint of each microscope slide with minimum contact against the specimen-receiving face of each slide. The container covers are secured to the container by elongated, flexible hinge material to enable the cover member to be rotated or articulated from the closed position to an open, stackable position disposed adjacent an outer, lower surface of the container. Each cover member includes a plurality of alignment posts received within indentations within a ledge surface of partition walls forming the container compartments to maintain the cover members in a fixed position, when closed.

Accordingly, an object of the present invention is to provide a new and improved microscope slide holder capable of removably retaining a plurality of microscope slides in a predetermined spaced relationship, one to another.

Another object of the present invention is to provide a new and improved container for handling, transportation and storage of microscope slides having a new and improved cover member enabling a plurality of containers to be stacked in a stable, horizontal position one upon another in either closed or open positions.

Another object of the present invention is to provide a new and improved microscope slide container including rounded protuberances extending upwardly from a base of the container and downwardly from a cover member adapted to secure each microscope slide within each individual compartment in a fixed position so that each microscope slide is not vertically movable within each compartment when the container is closed.

Another object of the present invention is to provide a new and improved microscope slide container including a plurality of separate microscope slidereceiving compartments each having a plurality of rounded vertical restraint protuberances in contact with the microscope slide from both below and above the microscope slide to prevent vertical movement of the microscope slides when the container cover is in a closed position.

Still another object of the present invention is to provide a new and improved microscope slide container having one or more hinged covers formed of elongated flexible material embedded by molding both in the container and in the cover to provide the cover with approximately 360° articulation and to ensure that the cover is in a properly aligned position in a closed position and in an open, stackable position.

BRIEF DESCRIPTION OF THE DRAWING

The above and other objects and advantages of the present invention will become apparent with reference to the following detailed description of the present invention taken in conjunction with the drawings wherein:

FIG. 1 is a partially broken away top view of the microscope slide container constructed in accordance with the principles of the present invention;

FIG. 2 is a cross-sectional view of the microscope slide container of the present invention taken along the line 2—2 of FIG. 1;

FIG. 3 is a cross-sectional view of the microscope slide holder of the present invention taken along the line 3—3 of FIG. 1;

FIG. 4 is a cross-sectional view of the microscope slide container of the present invention taken along the line 4—4 of FIG. 1;

FIG. 5 is a partially broken away perspective view of a portion of the microscope slide container of FIG. 1 showing a container cover member open 180°;

FIG. 6 is a partially broken away perspective view of a portion of the microscope slide holder of FIG. 1 showing the undersurface of the microscope slide holder of the present invention;

FIG. 7 is an enlarged, cross sectional view of the microscope slide holder of FIG. 5 taken through line 7—7 of FIG. 5 showing the cover member in solid lines open 180° and showing the cover member in broken lines in a closed position, and in an open, stackable position articulated approximately 360° from the closed position;

FIG. 8 is a partially broken away, end elevational view taken along the line 8—8 of FIG. 1 showing the cover members in a fully open, stackable position articulated approximately 360° from the closed position;

FIG. 9 is a view similar to FIG. 8 showing two microscope slide containers having cover members in the closed position stacked one upon the other; and FIG. 10 is a partially broken away cross-sectional view showing the portion of two microscope slide containers stacked with the covers in the fully open position.

DETAILED DESCRIPTION OF THE PREFERRED EMBODIMENT

Turning now to the drawings, and initially to FIG. 1, there is shown a new and improved container for handling, transportation and storage of microscope slides, generally designated by reference numeral 10. The microscope slide container 10 includes a unitary plastic molded base generally designated 12; a pair of mating, hinged cover members, generally designated 14 and 16; and a pair of elongated, flexible cover hinges 18 and 20, for example polyester mesh material, hingedly securing the cover members 14 and 16 to the microscope slide container 10.

The unitary plastic base 12 is molded from a sheet of thermoplastic or thermosetting solvent-resistant polymeric material, such as a polyolefin, for example, polypropylene or polyethylene which is resistant to alcohol and other chemicals encountered in microscope slide specimen analysis and storage and preferably is made opaque so that microscope slides within the container 10 easily can be visually observed therein.

As best shown in FIGS. 1, 5 and 6, the molded unitary plastic base 12 includes unitary, integral, upstanding longitudinal sidewalls designated generally 22 and 24 and transverse end walls designated generally 26 and 28 having generally planar upper surfaces 30, 32, 34, and 36, respectively, forming an integral ledge lying in a single plane providing a continuous cover support ledge extending entirely and continuously around the periphery of the unitary plastic molded base 12.

In accordance with the preferred embodiment shown in the drawings, the microscope slide container 10 includes an integral, longitudinal centrally disposed wall 38 extending upwardly from an inner surface 40 of the base 12 having a generally planar upper surface 42 forming an integral ledge lying in the same plane as the upper surfaces 30, 32, 34 and 36 of upstanding walls 22, 24, 26 and 28 forming the peripheral ledge surrounding the base 12. The central ledge 42 formed by the central wall member 38 supports both cover members 14 and 16 when the cover members 14 and 16 are in the closed position, as shown in FIGS. 1-4 and 9. The central longitudinal wall 38 separates microscope slide container 10 into two longitudinal rows of microscope slide-receiving compartments, separately coverable and uncoverable with separate cover members 14 and 16.

As best shown in FIGS. 1 and 5, the integral, upstanding walls 22, 24, 26 and 28, each are molded to include a plurality of arcuate, cut-out finger recesses 44 so that microscope slides can be lowered horizontally into the container 10 without tipping or dropping the slides to achieve an intended microscope slide position within the container 10.

The microscope slide container is divided into a plurality of separate compartments by integral, molded lateral separation walls 46, extending from the longitudinal upstanding ledge walls 22, 24 and 38. The separation walls 46 are spaced to provide individual compartments 48 having a size adapted to receive a single microscope slide, generally designated 49, in each compartment 48.

The integral upstanding longitudinal sidewalls 22 and 24 include interior surfaces 50 and 52, respectively, forming upstanding end walls of each microscope slide compartment 48. Similarly, the central longitudinal upstanding wall 38 includes vertical interior surfaces 54 and 56 forming opposite end walls for each microscope slide-receiving compartment 48. Accordingly, each microscope slide-receiving compartment 48 is a rectangular compartment bounded longitudinally by vertical upstanding end walls 50 and 54 or 52 and 56 and bounded laterally by four lateral separation walls 46. An upper surface 58 of each separation wall 46 lies in the same plane as the upper surfaces 30, 32, 34, 36 and 42 of the respective upstanding walls 22, 24, 26, 28 and 38.

In accordance with an important feature of the present invention, vertical restraints are provided in each microscope slide-receiving compartment to restrain each microscope slide from an upper face 57 and a lower face 59 against vertical movement when the cover members 14 and 16 are in a closed position.

Each microscope slide-receiving compartment 48 includes four lower vertical restraint members 60 extending vertically upwardly from the inner surface 40 of base 12, and molded integrally therewith. The lower vertical restraint members 60 extend vertically upwardly from the inner surface 40 of base 12 a short distance, for example 1/16", and each restraint member 60 includes a rounded upper surface 62 for contact against the undersurface or lower face 59 of the microscope slides 49 received within the microscope slide-receiving compartments 48. The rounded protuberances or lower vertical restraint members 60 hold each microscope slide 49 above the inner surface 40 of the base 12 so that the microscope slides 49 do not come in contact with any chemicals or solvents which may drip from a microscope slide 49 and lie on the inner surface 40 of the base 12. The rounded protuberances or lower vertical restraint members 60 are positioned close to the lateral separation walls 46 so that they contact a small area on the undersurface of the microscope slide on four very small contact areas at the rounded upper surfaces 62 near the longitudinal edges of each microscope slide. These lower vertical restraint members 60 may be used as a fulcrum for raising or lowering a microscope slide from or into each microscope-receiving compartment 48.

In accordance with an important feature of the present invention, the cover members 14 and 16 include a pair of rounded dimples or protuberances 64 extending downwardly from an inner surface 66 of each cover member 14 and 16. The rounded protuberances 64 are disposed in two longitudinal rows on the undersurface 66 of each cover member 14 and 16 so that a pair of rounded protuberances 64 overlies each microscope slide-receiving compartment 48. The cover protuberances 64 are positioned midway between each pair of lower vertical restraints 60 extending upwardly from the inner surface 40 of the base 12 to provide a pair of tri-axial vertical restraint members each formed by two lower vertical restraint members 60 and one upper vertical restraint member 64 to securely hold each microscope slide against vertical movement when the cover members 14 and 16 are in the closed position. Each of the rounded dimples or protuberances 64 extending downwardly from the inner surface 66 of the cover members 14 and 16, forming the upper vertical restraints, also include rounded ends 68 for contacting or coming very close to an upper face 57 of each microscope slide received within the microscope slide-receiving compartments 48 to substantially prevent vertical movement of each microscope slide when the cover members 14 and 16 are in a closed position (FIG. 2) or when the cover members 14 and 16 are in an open position and the containers 10 are stacked (FIG. 10). The upper vertical restraints 64 are disposed near the interior surfaces 50, 52, 54 and 56 of the upstanding longitudinal walls 22, 24 and 38 to lessen the likelihood of the upper vertical restraints 64 coming into contact with a specimen, generally centrally disposed on the upper face of a microscope slide. Further, the rounded ends 68 of the upper rounded protuberances 64 provide minimal contact against the upper face 57 of each microscope slide to minimize any possibility of disturbing a specimen 69 carried by the microscope slide 49.

In accordance with an important feature of the present invention, the upper surface 30 of upstanding longitudinal sidewall 22 includes three spaced rounded depressions 70, 72 and 74; the upper surface 32 of the upstanding longitudinal sidewall 24 includes three spaced rounded depressions 76, 78 and 80; and the upper surface 42 of the upstanding longitudinal central wall 38 includes three pairs of rounded depressions 82, 84; 86, 88; and 90, 92. The rounded depressions 70, 72, 74, 76, 78, 80, 82, 84, 86, 88, 90, and 92 are sized to receive a plurality of alignment posts, as described in more detail hereinafter. The alignment posts extend downwardly from the inner surface 66 of each cover member 14 and 16 and include: central alignment posts 94, 96, 98 and 100 disposed in alignment with the rounded depressions 72, 86, 88 and 78, respectively, when the cover members 14 and 16 are in the closed position, as shown in FIG. 3; cover corner alignment posts 102, 104, 106 and 108 disposed in alignment with rounded depressions 74, 90, 92 and 80, respectively, when the cover members 14 and 16 are in the closed position; and four opposite cover corner alignment posts 154, 156, 158 and 160 disposed to align with the rounded depressions 70, 82, 84 and 76 when the cover members 14 and 16 are in the closed position. The alignment posts and aligned wall depressions mate together when the cover members 14 and 16 are in the closed position to prevent the cover members 14 and 16 from longitudinal or lateral sliding movement on the upper surfaces 30, 32, 34, 36, and 42 of the upstanding longitudinal sidewalls 22, 24, the upstanding central wall 38 and the upstanding transverse end walls 26 and 28. By preventing any substantial movement of the cover members 14 and 16 with respect to the upstanding longitudinal walls 22, 24, 26, 28, and 38, the upper vertical restraint members 64 will not slide against the upper face of the microscope slides and, therefore, will not damage a specimen carried on a microscope slide.

In accordance with another important feature of the present invention, an upper surface 110 of each cover member 14 and 16 includes rounded depressions 114, 116, 118, 120, 122, 124, 126, 128, 162, 164, 166 and 168 formed in vertical alignment with each of the alignment posts 94, 96, 98, 100, 102, 104, 106, 108, 154, 156, 158 and 160, respectively, for receiving alignment posts extending outwardly from an undersurface of the same or another container, as will be described in more detail hereinafter.

The upper surface of the cover members 14 and 16 includes centrally disposed rounded depressions 114, 116, 118, and 120 vertically aligned with alignment posts 94, 96, 98, and 100, respectively (FIG. 3); cover corner rounded depressions 122, 124, 126 and 128 in vertical alignment with cover corner alignment posts 102, 104, 106, and 108 (FIG. 8), respectively, when the cover members 14 and 16 are in the closed position; and cover corner rounded depressions 162, 164, 166 and 168 (FIGS. 1 and 5) in vertical alignment with cover corner alignment posts 154, 156, 158 and 160.

The undersurface 112 of the base 12 includes downwardly extending rounded protuberances. Below transverse end wall 28, the undersurface 112 of base 12 includes rounded protuberances 130, 132, 134 and 136 (FIG. 8) in vertical alignment with wall depressions 74, 90, 92 and 80, respectively, and in vertical alignment with cover member depressions 122, 124, 126 and 128, respectively, and in vertical alignment with cover member alignment posts 130, 132, 134 and 136, respectively. Below the center of the longitudinal walls 22, 24 and 38, the undersurface 112 of the base 12 also includes rounded protuberances 138, 140, 142 and 144 (FIG. 3) in vertical alignment with longitudinal wall depressions 72, 86, 88 and 78, respectively; in vertical alignment with cover member depressions 114, 116, 118 and 120; and in vertical alignment with cover member alignment posts 94, 96, 98, and 100, respectively. Below the transverse end wall 26, the undersurface 112 of the base 12 includes rounded protuberance 146, 148, 150 and 152 (FIG. 2) in vertical alignment with transverse end wall depressions 70, 82, 84 and 76, respectively; in vertical alignment with cover member corner depressions 162, 164, 166 and 168; and in vertical alignment with cover member alignment posts 154, 156, 158 and 160.

As shown in FIGS. 7 and 8, the cover members 14 and 16 can be fully opened approximately 360° from the closed position to dispose the upper surface 110 of each cover member 14 and 16 against the undersurface 112 of the base 12 to insert the downwardly extending rounded protuberances 130, 132, 134, 136, 138, 140, 142, 144, 146, 148, 150 and 152 into the cover member depressions 122, 124, 126, 128, 114, 116, 118, 120, 162, 164, 166 and 168, respectively. The cover members 14 and 16, therefore, are secured against substantial sliding movement with respect to the undersurface 112 of base 12 due to the interfitting of the rounded protuberances within the cover member depressions.

In accordance with another important feature of the present invention, as shown in FIG. 10, when the containers 10 are stacked in the fully open position, as is commonly done for conveyance of a plurality of microscope containers to a drying oven, the cover member vertical restraints 64 from an upper container restrain the microscope slides 49 in a lower container. The cover member vertical restraints 64 from an upper fully open container 10 form a pair of tri-axial vertical restraints in each microscope slide-receiving compartment 48 of a lower container 10 together with lower restraints 60 of the lower container 10, to prevent damage to specimens 69.

Accordingly, the microscope slide container 10 of the present invention has a number of advantages, some of which have been described above and others of which are inherent in the invention. Also modifications can be made to the microscope slide container 10 without departing from the teachings of the present invention.

I claim:

1. A container for removably retaining a plurality of microscope slides in a predetermined spaced relationship, one to another, comprising:
    a generally planar lower wall having a generally planar inner surface and a generally planar outer surface;
    a plurality of partition walls extending upwardly from said inner surface of said lower wall defining a plurality of rectangular microscope slide-receiving compartments for spacing a plurality of microscope slides in a predetermined, spaced relationship, longitudinally and laterally one to another, above said inner surface of said lower wall;
    a plurality of protuberances within each of said slide-receiving compartments extending upwardly from the inner surface of said lower wall a shorter distance than the upward extension of the partition walls, said protuberances adapted to contact a lower surface of a microscope slide to space the microscope slide upwardly from the inner surface of said lower wall while maintaining longitudinal and lateral spacing of said microscope slides;
    a plastic cover member having a generally planar first surface adapted to overlie a plurality of microscope slides, in spaced relationship therewith, when the cover member is in the closed position, and a generally planar second surface forming an outer surface of the container when said cover member is in a closed position; said first surface including a plurality of rounded protuberances extending thereform within each of the slide-receiving compartments when the cover is in a closed position; and
    an elongated hinge member formed of a flexible material secured to an outer surface of the container and to said plastic cover member, said hinge member disposed to enable said cover member to be rotated from said closed position wherein the first surface overlies a plurality of microscope slides to an open, stackable position wherein the second surface of the cover member is disposed adjacent the outer surface of the lower wall.

2. The container of claim 1 wherein the protuberances extending from the inner surface of the lower wall are rounded and cooperatively disposed with respect to the rounded protuberances extending from the first surface of the cover member to form a pair of tri-axial microscope slide restraints within each microscope slide receiving compartment to restrain each microscope slide from both faces against vertical movement when the cover member is in a closed position.

3. The container of claim 1 wherein the flexible hinge material is a polymeric mesh material.

4. The container of claim 1 wherein the flexible hinge material is secured to the container by disposing the hinge material in contact with material within a mold, and thereafter molding the material into a predetermined container shape to embed the hinge material within the container material.

5. The container of claim 4 wherein the flexible hinge material is secured to the plastic cover by disposing the hinge material in contact with a plastic material within a cover member mold, and thereafter molding the plastic into a predetermined cover shape to embed the hinge material within the cover member.

6. The container of claim 1 wherein the container includes a continuous peripheral partition wall extending upwardly from, and extending around the entire periphery of, the inner surface of the lower wall.

7. The container of claim 6 wherein the peripheral wall includes an uppermost surface lying in a generally horizontal plane.

8. The container of claim 7 wherein the uppermost surface of the peripheral wall includes a plurality of indentations adapted to receive alignment posts extending from the first surface of the cover member, and wherein the first surface of the cover member includes a plurality of alignment posts cooperatively disposed with respect to said indentations such that the alignment posts are received in said indentations with the cover member in a closed position.

9. The container of claim 8 wherein the second surface of the cover member includes a plurality of indentations in alignment with the alignment posts extending from the first surface of the cover member, and wherein the outer surface of the lower wall includes a plurality of alignment posts extending therefrom cooperatively disposed with respect to the indentations in the second surface of the cover member such that with the cover member in an open, stackable position wherein the second surface of the cover member is disposed adjacent the outer surface of the lower wall, the alignment posts extending from the outer surface of the lower wall are received within the indentations in the cover member.

10. The container of claim 6 further including a centrally disposed partition wall extending upwardly from the inner surface of the lower wall dividing the container into two symmetrical sets of microscope-receiving compartments.

11. The container of claim 10 wherein the centrally disposed partition wall includes an uppermost, cover-contacting surface lying in the same plane as the peripheral wall.

12. The container of claim 11 wherein the centrally disposed partition wall includes a plurality of indentations adapted to receive a plurality of alignment posts extending from the first surface of the cover member, with the cover member in a closed position.

* * * * *